3,784,677
METHOD FOR THE PREPARATION OF METAL BORIDES

Geert Versteeg, Petten, and Albertus J. G. Engel, Heiloo, Netherlands, assignors to Reactor Centrum Nederland, The Hague, Netherlands
No Drawing. Filed Mar. 25, 1969, Ser. No. 810,375
Claims priority, application Netherlands, Mar. 26, 1968, 6804216; Belgium, Mar. 10, 1969, 71,113
Int. Cl. C01f 13/00
U.S. Cl. 423—252    13 Claims

ABSTRACT OF THE DISCLOSURE

A method for the preparation of metal borides by heating metal halides or metal oxyhalides of the actinide group, the lanthanide group and the alkaline earth metals with boron.

---

The invention relates to a method for the preparation of metal borides by heating one or more halides of the actinide, lanthanide or alkaline earth metals with boron.

The preparation of actinide borides with a low amount of impurities on a technical scale is very difficult.

Metal borides of actinide metals can be prepared, for instance, by heating a metal oxide with boron. The high temperatures required, however, are detrimental to the purity of the product or entail high costs for avoiding serious contamination of the product by the use of expensive appliances.

To take a specific example: The preparation of uranium boride according to the reaction $$UO_2 + 6B \longrightarrow UB_4 + B_2O_2 \nearrow$$

necessitates a temperature of about 2000° C. in order to carry the reaction through to its completion.

It has been found that by operating in graphite crucibles a reaction product containing about ten percent by weight of carbon is obtained. It is possible to obtain a practically pure product at high cost by heating the reaction mixture in an electron beam melting furnace.

The invention aims at avoiding these drawbacks in a simple manner by heating to a temperature of 600° to 1700° C. one or more metal halides or oxyhalides belonging to the actinide, lanthanide or alkaline groups of the Periodic Table with boron without the addition of a flux. By flux is meant in this case a molten foreign substance serving as reaction medium. The removal of the flux after completion of the reaction represents in additional processing operation which renders the method of preparation more complex and hence more expensive. Moreover, residual flux may cause contamination of the reaction product due to inclusions.

The use of metal halides or oxyhalides which are molten at the reaction temperature is to be greatly preferred, although highly reactive metal halides even in the solid state might possibly react with boron.

The most advantageous case is that in which the metal halide is not too volatile at the reaction temperature.

Examples of halides with suitable properties belonging to the group of the actinide metal halides are, among others, $ThF_4$ and $UF_4$.

The preparation of a uranium boride having substantially the composition $UB_4$, from $UF_4$ is much to be preferred, for instance, to other preparation methods.

Uranium boride can for instance be prepared by the successive operations of mixing finely-divided uranium metal powder with boron and heating the mixture.

It appears that the former method is especially suited for large amounts (a few hundred grams) of $UB_4$ with respect to contamination with other elements, such as carbon, oxygen, etc.

The latter method entails the drawback that finely-divided uranium metal powder is highly reactive with oxygen, in consequence of which the reaction product is liable to contain oxygen as an impurity, so that extensive measures have to be taken to prevent oxygen from coming into contact with the uranium powder.

On the other hand, the reaction component $UF_4$ is easy to deal with and can be mixed with boron without special precautions being taken.

A typical embodiment of one of the above-mentioned reactions is the method of preparation of $UB_4$ already referred to above, the reaction equation for which is:

$$3UF_4 + 16B \longrightarrow 3UB_4 + 4BF_3 \nearrow \qquad (1)$$

For this reaction a mixture of $UF_4$ and B is heated in an inert atmosphere at a temperature between 600° and 1700° C. The inert atmosphere used may for instance be argon gas.

Experiments with a thermobalance have shown that on heating a metal halide with boron until above the melting point of the halide the reaction generally begins at a temperature which is substantially lower than the melting point of this salt. This is the case, for instance, with LiF, $CaF_2$ and $UF_4$, for LiF and $CaF_2$ this temperature is about 200° C. lower than the melting point and for $UF_4$ about 400° C. lower than the melting point. For this reason $UF_4$ is extraordinarily suited for this sort of reactions.

A thermobalance is a device which simultaneously records a variation in weight and a variation in temperature of a substance or mixture of substances as a function of the time.

The temperature variation is in this case an increase in temperature.

The beginning of the reaction is in this case characterized by a decrease in weight of the metal halide/boron mixture.

It has been found that, by the addition of one or more metal oxides to the reaction mixture, the reaction whereby metal boride is formed takes place easier and at lower temperature. In that case the oxygen of the metal oxide reacts with a part of the admixed boron to form a halide-boron-oxygen compound which is volatile at the reaction temperature. A volatile compound of this kind is $(BOF)_3$, if one or more fluorides are taken as starting material. In general the metals of which the said halides and oxides are chosen, belong to the groups of the actinides, lanthanides and alkaline earths.

An example of the above-mentioned method of preparation is the preparation of $UB_4$ by heating equivalent quantities of $UF_4$, $U_3O_8$ and B.

The reaction equation is given by:

$$6UF_4 + 3U_3O_8 + 84B \longrightarrow 15UB_4 + 8(BOF)_3 \nearrow \qquad (2)$$

The compound $(BOF)_3$, boron fluoroxide, is not stable at low temperatures and decomposes on cooling into $B_2O_3$ and $BF_3$.

Thermodynamic data have shown that the reaction according to Equation 2 per mol of $UB_4$ formed is more exothermic than the reaction according to Equation 1.

It has been found in practice by readings taken with the aid of a thermobalance, that reaction (2) begins at 450° C., whereas reaction (1) starts up only at 600° C.

For the preparation of $UB_4$ according to reaction (2) the oxide $U_3O_8$ was selected as it can easily be obtained in a finely-divided reactive form and can then be handled in air. Finely-divided $UO_2$ might possibly also serve the purpose, though when in a finely-divided state it is far more difficult to keep it stoichiometric than in the case of $U_3O_8$. The deviation from the stoichiometric composition which $UO_2$ shows under all circumstances renders the addition of an equivalent quantity of oxide far more difficult than with $U_3O_8$. The use of $UO_2$ as a reaction component will in many cases have to be preceded by a determination of the oxide content, which measure is not necessary with $U_3O_8$. The use of a uranium dioxide reduced to approximately the stoichiometric composition and having, moreover, a large surface area, involves difficulties because of its strong tendency to abosorb oxygen from the atmosphere.

By the addition of an oxide to the reaction mixture, the temperature at which the reaction begins can generally be lowered to at least 100° C. below the melting point of a halide, a fact which has been shown by thermograms of reaction mixtures of $UF_4$, $CaF_2$ and $MgF_2$ and B to which $U_3O_8$, CaO and MgO respectively had been added. The lowering of the reaction temperatures of mixtures of $MgF_2$, $CaF_2$ and $UF_4$ to which the respective oxides had been added amounted respectively to 100° C., 250° C. and 500° C.

It has already been stated that boron fluoride $(BOF)_3$ decomposes at a low temperature into $B_2O_3$ and $BF_3$.

As $B_2O_3$ has a boiling point of 1500°, the reaction product generally contains boron oxide which has to be removed if a comparatively pure boride is to be prepared.

In order to obviate the occurrence of an excessive amount of boron oxide impurity in the reaction product, it is recommended that the reaction mixture be rapidly heated to a temperature above about 800° C. At temperatures above approximately 800° C., $(BOF)_3$ is in fact stable.

It is furthermore known that the chlorine compound $(BOCl)_3$, trichloroboronoxol, corresponding to $(BOF)_3$, is likewise unstable at low temperatures.

Reactions in which a compound like $(BOCl)_3$ or $(BOF)_3$ is formed may possibly play a part in the removal of traces of oxygen in the reaction product obtained on heating a halide with boron.

On account of the low stability of trihalogen boronoxol compounds it is advisable in all the aforementioned syntheses to heat the reaction mixture up to the reaction temperature as quickly as possible.

In certain cases the metal oxides to be used can be replaced, entirely or partly, by metal salts which decompose into oxides at elevated temperatures. Carbonates and oxalates, for instance, are examples of salts suitable for use in this way.

Replacement of the oxide by salts which decompose at an elevated temperature offers several advantages.

In the first place the temperature at which certain compounds such as $(BOCl)_3$ and $(BOF)_3$ are formed which are not stable at a low temperature, is shifted to a higher temperature level, this being necessary because the salt must first be decomposed into oxide. There is consequently less chance of boron oxide being formed in the reaction product at a low temperature of $(BOF)_3$ or $(BOCl)_3$.

It is to be noted in this connection that the use of metal salts which decompose into oxides is only of use if the decomposition takes place before a substantial evaporation of the halide occurs.

In addition to elementary boron, $B_2O_3$ may be used in the reaction mixture. Addition of $B_2O_3$ has the advantage that this material possesses a low melting point, namely 450° C.

Examples of reactions whereby B and $B_2O_3$ are used are the following reactions leading to the final reaction product $UB_4$.

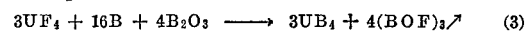
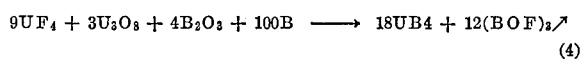

If a metal forms several borides it is possible by addition of a greater or smaller amount of boron to prepare the respective borides.

An example of such a metal is uranium, which metal forms the borides $UB_4$ and $UB_2$.

The boride $UB_2$ can be prepared according to the following reaction equations:

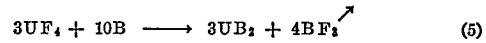
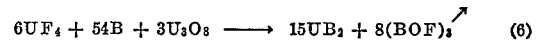
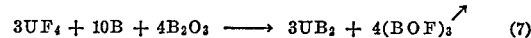

Should one wish to remove boron oxide impurity occurring in the reaction product, this can be achieved by melting the metal boride obtained in a protective atmosphere.

As the melting points of metal borides are usually very high, the $B_2O_3$ volatilizes in the process, its boiling point being in the vicinity of 1500° C.

By being remelted, the metal boride is at the same time densified.

A suitable method of remelting is by melting in an atmosphere of argon in a D.C. electric arc furnace.

It is advantageous to use an electrode consisting of the metal boride to be melted.

It has been found that contamination of the melt by other elements is effectively reduced by this method. For the melting of uranium boride an electrode of uranium boride has been successfully used instead of the tungsten electrode which is nearly always employed.

It is very important for nuclear applications that actinide borides as $UB_4$ or $ThB_4$ are free from contamination by other elements.

The invention is further elucidated in the six examples given below.

Example I describes the process of preparing uranium tetraboride by heating equivalent quantities of boron and uranium tetrafluoride.

Example II describes the process of preparing uranium tetraboride by heating a mixture of equivalent quantities of boron, uranium tetrafluoride and $U_3O_8$.

Example III describes the process of preparing uranium diboride by heating of a mixture of boron and $UF_4$.

Example IV describes the process of preparing uranium diboride by heating of a mixture of boron, $U_3O_8$ and $UF_4$.

Example V describes the process of preparing calcium hexaboride by heating equivalent quantities of $CaF_2$ and B.

Example VI describes the process of preparing calcium hexaboride by heating equivalent quantities of $CaF_2$, CaO and B.

EXAMPLE I

Mixtures of equivalent quantities of $UF_4$ and B were mixed in a pebble mill and compressed into tablets. The length of the tablets varied between 10 and 20 mm., the diameter being 12 or 18 mm.

Portions of about 120 g. of tablets (3 or 4 tablets) were then heated for 16 hours at 1500° C. in a tube furnace in an argon atmosphere freed from oxygen. The speed of heating-up of the tube furnace was about 500° C. per hour.

After being cooled in an argon atmosphere the tablets were found to have been converted into brittle, porous, grey metallic tablets of reaction product of about the same shape.

The tablets of reaction product obtained were melted in an electric arc furnace in an atmosphere of purified argon in order to remove $B_2O_3$ and to compact the reaction product. The remelted reaction product was radiographically examined, it being found in this way that the product was mainly $UB_4$ together with small quantities of $UB_2$ and $UO_2$.

EXAMPLE II

In this example, mixtures of equivalent quantities of $UF_4$, $U_3O_8$ and B were treated in the same way and heated as in Example I.

The reaction product was found in this case to consist of porous, likewise grey, metallic tablets like those in Example I.

These porous tablets could very easily be knocked into a fine powder.

The tablets obtained were remelted in the same way as in Example I, with resulting formation of a more or less identical product.

The difference between Example I and Example II was that the reaction according to Example II passed off somewhat more easily than the reaction according to Example I.

EXAMPLES III AND IV

Amounts of respectively $UF_4$ and B and $UF_4$, $U_3O_8$ and B were mixed in amounts according to about the reaction Equations 5 and 6 and heated according to the method described in Example I. An excess of B of 25 percent was mixed in the reaction mixture with respect to the loss of boron during the remelting.

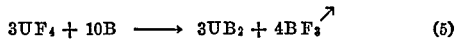
$$3UF_4 + 10B \longrightarrow 3UB_2 + 4BF_3 \nearrow \qquad (5)$$

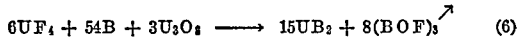
$$6UF_4 + 54B + 3U_3O_8 \longrightarrow 15UB_2 + 8(BOF)_3 \nearrow \qquad (6)$$

According to the reaction Equations 5 and 6 $UB_2$ reaction products were formed with B/U ratios of respectively 2:90 and 2:25. The B/U ratios were determined after the remelting in the argon arc furnace.

It appeared by X-ray analyses that the reaction product was $UB_2$, whereby the excess of B was present as $UB_4$.

INTRODUCTION TO EXAMPLES V AND VI

Of the fluoride $CaF_2$, equivalent mixtures with B and with B and CaO respectively were prepared for the synthesis of borides according to the undermentioned reaction equations.

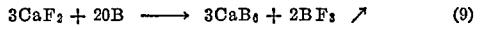
$$3CaF_2 + 20B \longrightarrow 3CaB_6 + 2BF_3 \nearrow \qquad (9)$$

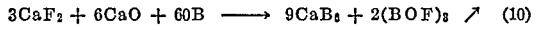
$$3CaF_2 + 6CaO + 60B \longrightarrow 9CaB_6 + 2(BOF)_3 \nearrow \qquad (10)$$

Of each mixture two pellets were pressed, about 5 grams in weight and 16 mm. in diameter, which pellets were heated in an argon atmosphere in the same way as in Examples I and II.

Detailed particulars of each of the Examples V and VI, are given below.

EXAMPLE V

In this example, calcium hexaboride was prepared by heating equivalent mixtures of $CaF_2$ and B according to reaction Equation 9.

Radiographic analysis showed that the reaction product consisted of calcium hexaboride with a comparatively small CaF impurity.

EXAMPLE VI

In this example, calcium hexaboride was prepared by heating equivalent quantities $CaF_2$, CaO and B according to reaction Equation 10.

The reaction product showed on being subjected to radiographic examination that it contained a smaller amount of $CaF_2$ than the reaction product according to Example V.

On the basis of the tests carried out according to Examples II, IV and VI, it is evidently also possible to use a less than equivalent amount of oxide as is necessary for the previously mentioned reactions (2), (6) or (10).

The amount of boron, however, has to be equivalent with respect to the available amount of metal in the halide and oxide together.

The invention is restricted to metal halides whose metals form borides.

During the remelting of the metal borides in the D.C. electric argon arc furnace some loss of B occurs.

In case of the remelting of $UB_4$ the loss of B in the final product could be prevented by the addition of B before or during the remelting. At the same time some purifying takes place by means of reaction of traces reactants which had not reacted with boron before. By application of the latter method it was possible to prepare stoichiometric $UB_4$, which compound is very suitable for nuclear applications.

The metal borides prepared according to the beforementioned methods are for instance applicable in control rods for nuclear reactors.

Another application of the metal borides is as dispersion in a fissile and fertile or fissile material consisting of oxides in order to control the reactivity of this material during use as a nuclear fuel. The metal boride has to be compatible at high temperatures with respect to fissile and fertile oxides as $UO_2$, $PuO_2$ and $ThO_2$. Suitable borides are $UB_4$, $ThB_4$ and mixtures of $UB_4$ and $ThB_4$.

For non-nuclear purposes the metal borides can be applied for instance as electrodes for high temperatures or as so called "hard metals" in cutting tools.

What is claimed is:

1. A method of preparing an essentially pure metal boride, the metal member being selected from the group consisting of actinide, lanthanide and alkaline earth metal comprising mixing in stoichiometric to 25% excess of the stoichiometric amounts of components (1) and (2) wherein (1) is a mixture of metal fluoride or metal oxyfluoride and the corresponding metal oxide or metal salt which decompose to metal oxide and (2) is boron or a mixture of boron and boron oxide wherein the metal members are as defined and heating the mixture comprising components (1) and (2) at between 600° C. and 1700° C. in an inert atmosphere.

2. A method according to claim 1, in which the metal fluorides and metal oxyfluorides are molten at the reaction temperature.

3. A method according to claim 1, in which the metal fluorides are $CaF_2$ $UF_4$ and $ThF_4$.

4. A method according to claim 1, in which said mixture consists of $UF_4$, $U_3O_8$ and B.

5. A method according to claim 1, in which said mixture consists of $CaF_2$, CaO and B.

6. A method according to claim 1, in which heating is effected rapidly up to a temperature of above about 800° C.

7. A method according to claim 1, in which said mixture consists of $UF_4$, $U_3O_8$, $B_2O_3$ and B.

8. A method as claimed in claim 1, wherein the inert atmosphere comprises a vacuum.

9. A method according to claim 1 in which the boride formed is remelted in an inert atmosphere.

10. A method according to claim 9, in which the remelting is effected in an atmosphere of argon in a D.C. electric arc furnace.

11. The method according to claim 10, in which a metal boride is used as electrode in the D.C. electric arc furnace.

12. The method according to claim 10 in which an actinide metal boride is used as the electrode in the melting of actinide metal borides in the D.C. electric arc furnace.

13. A method according to claim 9 in which the metal boride is $UB_4$.

References Cited

UNITED STATES PATENTS

| | | | |
|---|---|---|---|
| 2,678,870 | 5/1954 | Cooper | 23—345 |
| 3,004,830 | 10/1961 | Orne | 23—204 |
| 3,106,455 | 10/1963 | Ripley | 23—204 |
| 3,244,482 | 5/1966 | Culbertson et al. | 23—204 |
| 3,258,316 | 6/1966 | Tepper et al. | 23—344 |
| 3,332,750 | 7/1967 | Beucherie et al. | 23—344 |
| 3,379,647 | 4/1968 | Smudski | 252—301.1 |

OTHER REFERENCES

Morel et al.: Final Report on a study of Selected Metallic Borides, Nitrides, & Phosphides, Univ. of Louisville Inst. of Ind. Research, pp. 12–15, 22 and 23.

CARL D. QUARFORTH, Primary Examiner

F. M. GITTES, Assistant Examiner

U.S. Cl. X.R.

252—301.1 R; 423—251, 254, 289